United States Patent
Kalyanaraman et al.

(10) Patent No.: US 11,359,059 B2
(45) Date of Patent: Jun. 14, 2022

(54) METHOD OF PREPARING POLYMER PARTICLES AND POLYMER PARTICLES PREPARED THEREBY

(71) Applicant: SABIC Global Technologies B.V., Bergen op Zoom (NL)

(72) Inventors: Viswanathan Kalyanaraman, Newburgh, IN (US); Thomas Link Guggenheim, Mt. Vernon, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 609 days.

(21) Appl. No.: 16/342,026

(22) PCT Filed: Oct. 20, 2017

(86) PCT No.: PCT/US2017/057532
§ 371 (c)(1),
(2) Date: Apr. 15, 2019

(87) PCT Pub. No.: WO2018/080911
PCT Pub. Date: May 3, 2018

(65) Prior Publication Data
US 2019/0248964 A1 Aug. 15, 2019

Related U.S. Application Data

(60) Provisional application No. 62/414,084, filed on Oct. 28, 2016.

(51) Int. Cl.
*C08G 73/10* (2006.01)
*C08J 3/14* (2006.01)
*C08J 3/11* (2006.01)

(52) U.S. Cl.
CPC .......... *C08J 3/14* (2013.01); *C08G 73/1071* (2013.01); *C08J 3/11* (2013.01); *C08G 2250/00* (2013.01); *C08J 2379/08* (2013.01)

(58) Field of Classification Search
CPC ...... C08L 79/08; C08G 73/10; C08J 2379/08; C08J 3/14
See application file for complete search history.

(56) References Cited

U.S. PATENT DOCUMENTS

| | | | |
|---|---|---|---|
| 5,994,483 A | 11/1999 | Bruck et al. | |
| 6,713,597 B2 | 3/2004 | Lindway | |
| 2003/0181626 A1* | 9/2003 | Lindway | C09D 179/08 528/170 |
| 2006/0270825 A1* | 11/2006 | Angermeier | C08G 69/04 528/310 |
| 2014/0272430 A1 | 9/2014 | Kalayaraman | |
| 2014/0275365 A1 | 9/2014 | Kalayaraman et al. | |

FOREIGN PATENT DOCUMENTS

| EP | 1197512 | 4/2002 |
|---|---|---|
| WO | 2016134224 | 8/2016 |
| WO | 2018080911 | 5/2018 |

OTHER PUBLICATIONS

Odian, G. "Principles of Polymerization, 4th ed.", 2008 (pp. 26-29).
Hsieh et al., "Transient crystallization of an aromatic polyetherimide: effect of annealing" Polymer, 1992, vol. 33, No. 2, pp. 306-313.
International Search Report for International Application No. PCT/US2017/057532; International Filing Date: Oct. 20, 2017; dated Jan. 31, 2018; 6 pages.
Kim, "Nano/micro spherical poly(Methyl methacrylate) particle formations by cooling from polymer solution," Powder Technology, 2005, vol. 154, No. 2-3, pp. 156-163.
Written Opinion of the International Searching Authority for International Application No. PCT/US2017/057532; International Filing Date: Oct. 20, 2017; dated Jan. 31, 2018; 9 pages.
Xiong et al., "Surfactant free fabrication of polyimide nanoparticles," American Institute of Physics, 2004, vol. 85, No. 23, pp. 5733-5735.

* cited by examiner

*Primary Examiner* — Gregory Listvoyb
(74) *Attorney, Agent, or Firm* — Cantor Colburn LLP

(57) ABSTRACT

A method of preparing polymer particles includes combining a polyetherimide and a solvent at a first temperature to provide a slurry, wherein the polyetherimide is not soluble in the solvent at the first temperature; heating the slurry to a second temperature and at a pressure effective to dissolve the polyetherimide in the solvent to provide a homogenous solution; cooling the homogenous solution to a third temperature to provide a dispersion including a plurality of polymer particles; and isolating the polymer particles. The polymer particles have a Dv90 particle size of less than or equal to 250 micrometers. Polymers powders prepared according to the method are also described herein, wherein the powder includes a plurality of semi-crystalline polymer particles having a Dv90 of less than or equal to 250 micrometers.

20 Claims, 8 Drawing Sheets

METHOD OF PREPARING POLYMER PARTICLES AND POLYMER PARTICLES PREPARED THEREBY

CROSS-REFERENCE TO RELATED APPLICATIONS

This Application is a U.S. National Stage Application of PCT/US2017/057532, filed Oct. 20, 2017, which claims priority to U.S. Provisional Patent Application No. 62/414,084, filed Oct. 28, 2016 both of which are incorporated by reference in their entireties herein.

BACKGROUND

Polyimides, in particular polyetherimides (PEI) are amorphous, transparent, high performance polymers having a glass transition temperature (Tg) of greater than 180° C. Polyetherimides further have high strength, toughness, heat resistance, and modulus, and broad chemical resistance, and so are widely used in industries as diverse as automotive, telecommunication, aerospace, electrical/electronics, transportation, and healthcare. Polyetherimides have shown versatility in various manufacturing processes, proving amenable to techniques including injection molding, extrusion, and thermoforming, to prepare various articles.

High performance polymers such as polyetherimides can be made into powders, for example ultra-fine powders having a diameter of less than or equal to 75 micrometers. Such powders can be made by emulsion processes, for example by emulsifying the polymer in an organic solvent and removing the organic solvent from the emulsion through distillation. However, particles made by such methods can result in poor yields. Furthermore, some polymers are not amenable to such processes, in particular, polymers having reduced solubility in organic solvents.

Accordingly, there remains a need for a facile method for preparing polymer particles, in particular for use with polymers where processability limitations preclude the use of known methods (e.g., emulsion processes) and where high yields are desired.

BRIEF DESCRIPTION

A method of preparing polymer particles comprises combining a polyetherimide and a solvent at a first temperature to provide a slurry, wherein the polyetherimide is not soluble in the solvent at the first temperature; heating the slurry to a second temperature and at a pressure effective to dissolve the polyetherimide in the solvent to provide a homogenous solution; cooling the homogenous solution to a third temperature to provide a dispersion comprising a plurality of polymer particles; and isolating the polymer particles from the dispersion; wherein the polymer particles have a Dv90 particle size of less than or equal to 250 micrometers, preferably less than or equal to 150 micrometers, more preferably less than or equal to 75 micrometers, and wherein the polyetherimide comprises repeating units of the formula

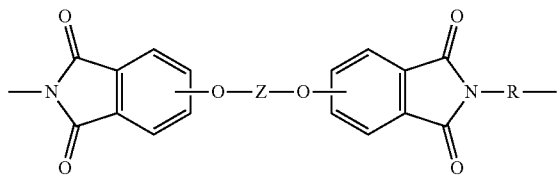

wherein at least 90 mole percent, or at least 95 mole percent, or at least 98 mole percent of the R groups are paraphenylene and the remaining R groups are each independently the same or different, and are a substituted or unsubstituted $C_{6-20}$ aromatic hydrocarbon group, a substituted or unsubstituted, straight or branched chain $C_{4-20}$ alkylene group, a substituted or unsubstituted $C_{3-8}$ cycloalkylene group, or a combination comprising at least one of the foregoing; and each Z is independently an aromatic $C_{6-24}$ monocyclic or polycyclic group optionally substituted with 1 to 6 $C_{1-8}$ alkyl groups, 1 to 8 halogen atoms, or a combination comprising at least one of the foregoing.

Another embodiment is a polymer powder prepared by the above method, wherein the polymer powder comprises a plurality of polymer particles having a Dv90 particle size of less than or equal to 250 micrometers, preferably less than or equal to 150 micrometers, more preferably less than or equal to 75 micrometers; the polymer particles are substantially spherical in morphology; and the polymer particles are semi-crystalline.

Another embodiment is a polymer powder prepared by the above method, wherein the polymer powder comprises a plurality of polymer particles having a Dv90 particle size of less than or equal to 250 micrometers, preferably less than or equal to 150 micrometers, more preferably less than or equal to 75 micrometers; the polymer particles are irregularly shaped in morphology; and the polymer particles are semi-crystalline.

The above described and other features are exemplified by the following figures and detailed description.

BRIEF DESCRIPTION OF THE DRAWINGS

The following figures are of exemplary embodiments.

DETAILED DESCRIPTION

Figure 1:
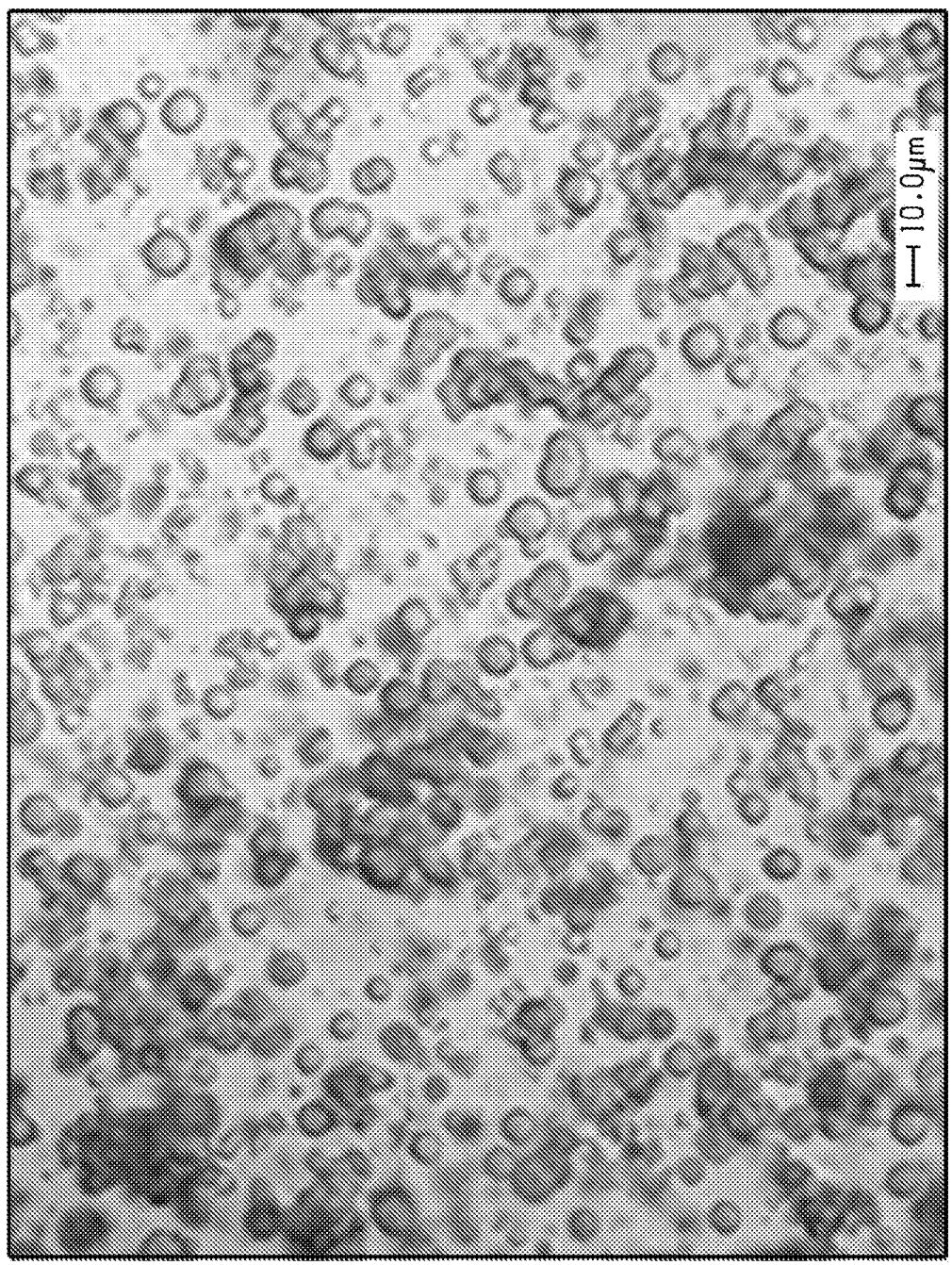
FIG. 1 shows an optical micrograph of polymer particles of Example 1.

Disclosed herein is a method of preparing polymer particles, in particular, polyetherimide particles. The present inventors have unexpectedly discovered that polymer particles can be prepared by heating the polymer to a temperature and pressure effective to dissolve the polymer, and subsequently cooling the solution to precipitate the desired polymer particles. Advantageously, the morphology and size distribution of the resulting polymer particles can be controlled through the solids content of the solution, the cooling rate used, and the optional addition of a surfactant. Additionally, no anti-solvent to effect precipitation is required.

Accordingly, an aspect of the present disclosure is a method of preparing polymer particles. The method comprises combining a polyetherimide and a solvent at a first temperature to provide a slurry. The polyetherimide and the solvent can be combined such that the resulting slurry preferably has a solids content (i.e., weight percent of polyetherimide, based on the total weight of the polyetherimide and the solvent) of less than 40%, or less than 30%, or less than 20%, or less than 10%, or less than 5%. In some embodiments, the slurry can have a solids content of greater than 0 to 40%, or 1 to 30%, or 1 to 20%, or 1 to 10%, or 1 to 5%. The polyetherimide is generally not soluble in the solvent at the first temperature. In some embodiments, the first temperature can be less than or equal to 100° C., preferably 15 to 100° C., more preferably 20 to 50° C.

Polyetherimides of the present disclosure comprise more than 1, for example 2 to 1000, or 5 to 500, or 10 to 100 structural units of formula (1)

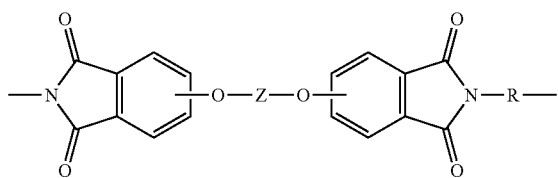

(1)

wherein at least 90 mole percent, or at least 95 mole percent, or at least 98 mole percent of the R groups are paraphenylene and the remaining R groups are each independently the same or different, and are a substituted or unsubstituted $C_{6-20}$ aromatic hydrocarbon group, a substituted or unsubstituted, straight or branched chain $C_{4-20}$ alkylene group, a substituted or unsubstituted $C_{3-8}$ cycloalkylene group, or a combination comprising at least one of the foregoing. In some embodiments R is divalent group of one or more of the following formulas (2)

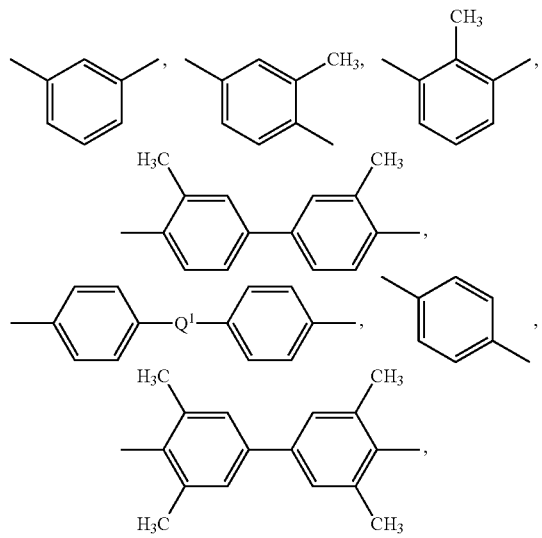

(2)

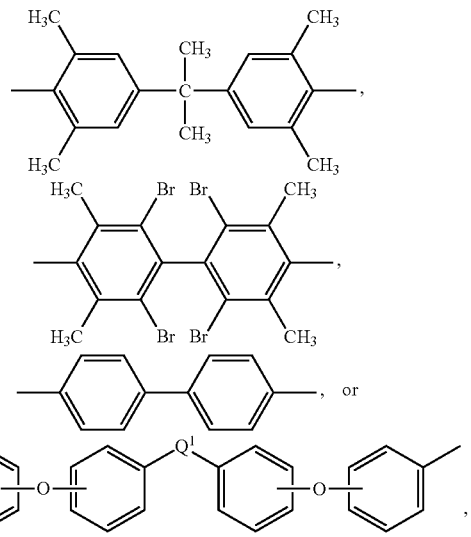

wherein $Q^1$ is —O—, —S—, —C(O)—, —SO$_2$—, —SO—, —P(R$^a$)(=O)— wherein R$^a$ is a $C_{1-8}$ alkyl or $C_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In some embodiments, up to 10 mole percent of the R groups contain sulfone groups, and in other embodiments no R groups contain sulfone groups.

Further in formula (1), the divalent bonds of the —O—Z—O— group are in the 3,3', 3,4', 4,3', or the 4,4' positions, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded. Exemplary groups Z include groups of formula (3)

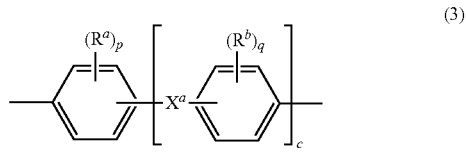

(3)

wherein $R^a$ and $R^b$ are each independently the same or different, and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (3a)

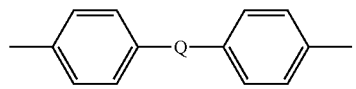
(3a)

wherein Q is —O—, —S—, —C(O)—, —SO$_2$—, —SO—, —P(R$^a$)(=O)— wherein R$^a$ is a $C_{1-8}$ alkyl or $C_{6-12}$ aryl, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

The polyetherimide comprises repeating units according to formula (1), wherein at least 90 mole percent, or at least 95 mole percent, or at least 98 mole percent of the R groups are para-phenylene and the remaining R groups are each independently the same or different, and are a substituted or unsubstituted $C_{6-20}$ aromatic hydrocarbon group, a substituted or unsubstituted, straight or branched chain $C_{4-20}$ alkylene group, a substituted or unsubstituted $C_{3-8}$ cycloalkylene group, or a combination comprising at least one of the foregoing, and each Z is independently an aromatic $C_{6-24}$ monocyclic or polycyclic group optionally substituted with 1 to 6 $C_{1-8}$ alkyl groups, 1 to 8 halogen atoms, or a combination comprising at least one of the foregoing. In some embodiments, at least 90 mole percent, or at least 95 mole percent, or at least 98 mole percent of the R groups are para-phenylene and the remaining R groups are meta-phenylene. In some embodiments, 100 mole percent of the R groups are p-phenylene. In some embodiments, Z is a divalent group of formula (3a), preferably wherein Q is 2,2-isopropylidene.

In some embodiments, 100 mole percent of the R groups are p-phenylene and each Z is 4,4'-diphenylene isopropylidene. Thus, in some embodiments, the polyetherimide can be a polyetherimide comprising repeating units of the formula

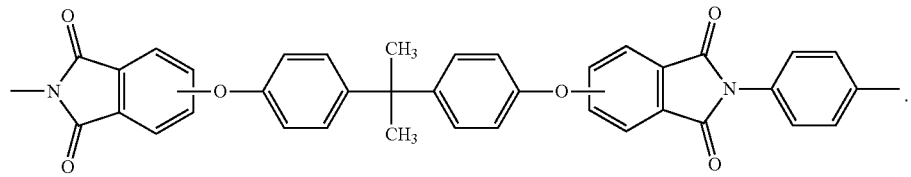

In some embodiments, the polyetherimide is a copolymer that optionally comprises additional structural imide units that are not polyetherimide units, for example imide units of formula (4)

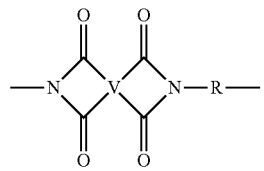
(4)

wherein R is as described in formula (1) and each V is the same or different, and is a substituted or unsubstituted $C_{6-20}$ aromatic hydrocarbon group, for example a tetravalent linker of the formulas

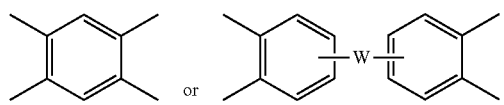

wherein W is a single bond, —S—, —C(O)—, —SO$_2$—, —SO—, or —C$_y$H$_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mol % of the total number of units. In some embodiments, no additional imide units are present in the polyetherimide.

The polyetherimide can be prepared by any of the methods well known to those skilled in the art, including the reaction of an aromatic bis(ether anhydride) of formula (5)

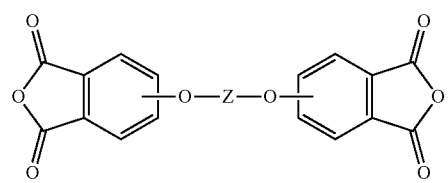
(5)

with an organic diamine of formula (6)

(6)

wherein Z and R are as described above. Copolymers of the polyetherimides can be manufactured using a combination of an aromatic bis(ether anhydride) of formula (5) and a different bis(anhydride), or using a combination of an organic diamine of formula (6) and a different diamine.

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; and, 4-(2,3-dicarboxyphenoxy)-4'-(3,4-dicarboxyphenoxy)diphenyl sulfone dianhydride, as well as various combinations thereof.

Examples of organic diamines include hexamethylenediamine, polymethylated 1,6-n-hexanediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis (p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. Combinations of these compounds can also be used. In some embodiments the organic diamine is m-phenylenediamine, p-phenylenediamine, 4,4'-diaminodiphenyl sulfone, or a combination comprising at least one of the foregoing, preferably p-phenylene diamine, m-phenylene diamine, or a combination comprising at least one of the foregoing, more preferably p-phenylene diamine.

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide has a weight average molecular weight (Mw) of 1,000 to 150,000 grams/mole (Dalton), as measured by gel permeation chromatography, using polystyrene standards. In some embodiments the polyetherimide has an Mw of 10,000 to 80,000 Daltons. Such polyetherimides typically have an intrinsic viscosity greater than 0.2 deciliters per gram (dl/g), or, more specifically, 0.35 to 0.7 dl/g as measured in m-cresol at 25° C.

The solvent can generally be any organic solvent provided that the polyetherimide is not soluble in the solvent at the first temperature, but soluble at the second temperature under the conditions as described in further detail below. In some embodiments, it is possible to determine solubility at ambient temperature, such that in some embodiments, the polyetherimide has a solubility of less than 2000 milligrams per 100 milliliters, preferably less than 1000 milligrams per 100 milliliters of the solvent at 23° C. The solvent can comprise ortho-dichlorobenzene, ortho-cresol, meta-cresol, para-cresol, chlorobenzene, bromobenzene, anisole, veratrole, dichlorotoluene, dichlorobenzene, 1,2,4-trichlorobenzene, xylene, toluene, benzene, ethylbenzene, propylbenzene, mesitylene, N-methylpyrrolidinone, dimethylacetamide, dimethylformamide, diphenyl sulfone, diphenylether, phenetole, dimethylsulfoxide, sulfolane, dimethylsulfolane, methylene chloride, ethylene tetrachloride, trichloromethane, acetone, methanol, ethanol, cyclopentanone, tetrahydrofuran, or a combination comprising at least one of the foregoing. In some embodiments, the solvent comprises ortho-dichlorobenzene.

In some embodiments, in addition to the polyetherimide and the solvent, the slurry can optionally further comprise a surfactant. The surfactant can be a nonionic surfactant, an anionic surfactant, or a combination comprising at least one of the foregoing. Exemplary nonionic surfactants can include a $C_{8-22}$ aliphatic alcohol ethoxylate having about 1 to about 25 mol of ethylene oxide and having have a narrow homolog distribution of the ethylene oxide ("narrow range ethoxylates") or a broad homolog distribution of the ethylene oxide ("broad range ethoxylates"); and preferably $C_{10-20}$ aliphatic alcohol ethoxylates having about 2 to about 18 mol of ethylene oxide. Examples of commercially available nonionic surfactants of this type are Tergitol 15-S-9 (a condensation product of $C_{1-15}$ linear secondary alcohol with 9 moles ethylene oxide), Tergitol 24-L-NMW (a condensation product of $C_{12-14}$ linear primary alcohol with 6 moles of ethylene oxide) with a narrow molecular weight distribution from Dow Chemical Company. This class of product also includes the GENAPOL brands of Clariant GmbH.

Other nonionic surfactants that can be used include polyethylene, polypropylene, and polybutylene oxide condensates of $C_{6-12}$ alkyl phenols, for example compounds having 4 to 25 moles of ethylene oxide per mole of $C_{6-12}$ alkylphenol, preferably 5 to 18 moles of ethylene oxide per mole of $C_{6-12}$ alkylphenol. Commercially available surfactants of this type include Igepal CO-630, Triton X-45, X-114, X-100 and X102, Tergitol TMN-10, Tergitol TMN-100X, and Tergitol TMN-6 (all polyethoxylated 2,6,8-trimethyl-nonylphenols or mixtures thereof) from Dow Chemical Corporation, and the Arkopal-N products from Hoechst AG.

Still others include the addition products of ethylene oxide with a hydrophobic base formed by the condensation of propylene oxide with propylene glycol. The hydrophobic portion of these compounds preferably has a molecular weight between about 1500 and about 1800 Daltons. Commercially available examples of this class of product are the Pluronic brands from BASF and the Genapol PF trademarks of Hoechst AG.

The addition products of ethylene oxide with a reaction product of propylene oxide and ethylenediamine can also be used. The hydrophobic moiety of these compounds consists of the reaction product of ethylenediamine and excess propylene oxide, and generally has a molecular weight of about 2500 to about 3000 Daltons. This hydrophobic moiety of ethylene oxide is added until the product contains from about 40 to about 80 wt % of polyoxyethylene and has a molecular weight of about 5000 to about 11,000 Daltons. Commercially available examples of this compound class are the Tetronic brands from BASF and the Genapol PN trademarks of Hoechst AG.

In some embodiments, the nonionic surfactant is a $C_{6-12}$ alkyl phenol having 4 to 25 moles of ethylene oxide per mole of $C_{6-12}$ alkylphenol, preferably 5 to 18 moles of ethylene oxide per mole of $C_{6-12}$ alkylphenol.

Exemplary anionic surfactants can include ammonium lauryl sulfate, sodium lauryl ether sulfate (SLES), sodium myreth sulfate, dioctyl sodium sulfosuccinate, perfluorooctanesulfonate (PFOS), perfluorobutanesulfonate, linear alkyl benzene sulfonates, sodium dodecyl benzene sulfonate, sodium lauryl sulfate, or a combination comprising at least one of the foregoing.

Combinations of any of the foregoing surfactants can be included in the slurry.

When present, a surfactant can be included in the slurry in an amount of 0.1 to 10 weight percent, based on the total weight of the slurry. In some embodiments, no surfactants are added to the slurry.

In some embodiments, the slurry can optionally further comprise an additive for polyetherimide slurries and particles known in the art, with the proviso that the additive(s) are selected so as to not significantly adversely affect the desired properties of the slurry, the homogenous solution, or the resulting polymer particles. Such additives include a particulate filler (such as glass, carbon, mineral, or metal), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. Additives can also include aqueous polymer dispersions or emulsions comprising polymers that are different from the polyetherimide and polycarbonate discussed above. Examples include poly(tetrafluoroethylene) (PTFE) emulsions, (meth)acrylic emulsions, and the like. In some embodiments, the slurry can include a nanometer- or micrometer-sized organic or inorganic filler. Exemplary fillers can include titania, talc, clay, silica, and the like, or combinations comprising at least one of the foregoing. Without wishing to be bound by theory, it is believed that addition of such fillers to the slurry can aid in crystallization of the polyetherimide during cooling by acting as a seed. Thus, the resulting polymer particles can also include the additives that are added to the slurry prior to formation of the polymer particles. In general, the additives are used in the amounts generally known to be effective. For example, the total amount of the additive composition (other than any filler) can be 0.001 to 10.0 wt %, or 0.01 to 5 wt %, each based on the total weight of the polymer dispersion. When used as a nucleating agent, the filler can also be present as part of the additive composition in the foregoing amounts.

The method further comprises heating the polyetherimide slurry to a second temperature for a time and at a pressure effective to dissolve the polyetherimide in the solvent to provide a homogenous solution. The second temperature, time of heating, and pressure during heating can be adjusted to effect dissolution. For example, a lower temperature can be effective when the pressure is increased, or a higher temperature can be effective at a lower pressure. The precise conditions can be determined by one of ordinary skill in the art without undue experimentation using the guidelines described herein.

The second temperature can be greater than or equal to 200° C., preferably 200 to 300° C., more preferably 225 to 275° C., even more preferably 240 to 260° C. Heating below these temperatures can lead to incomplete dissolution, or very lengthy processing times. Heating above these temperatures can lead to unwanted side products. In some embodiments, the slurry can be heated continuously until the second temperature is reached. In some embodiments, the slurry can be heated step-wise with one, two, three or more intermediate stops at preselected temperatures which are greater than the first temperature, but less than the second temperature.

The time the slurry is heated at the second temperature can vary widely depending on the temperature and pressure used. It is generally desirable to heat for as short a time as possible for efficiency and to decrease formation of any side products. For example, the total time of heating can be 5 seconds to 8 minutes, or 10 seconds to 5 minutes, or 30 seconds to 3 minutes. In some embodiments, when step-wise heating is used, the slurry can be maintained at the intermediate temperature(s) for 10 to 60 seconds, preferably 10 to 30 seconds. In some embodiments, when the second temperature is reached, the slurry or solution can be maintained at the second temperature for 10 to 60 seconds, for example 20 to 40 seconds.

The pressure can be adjusted to effect dissolution, and can be selected based on the second temperature. For example, higher pressure can allow for the use of lower temperature, or a lower pressure can necessitate use of higher temperature. For example, the pressure can be less than 250 pounds per square inch (gauge) (psig) (1.72 MPa), or less than 150 psig (1.03 MPa), or less than 100 psig (0.69 MPa). Within these ranges, the pressure can be greater than or equal to 0 psig (0 MPa), or greater than or equal to 5 psig (0.03 MPa), or greater than or equal to 20 psig (0.14 MPa). In some embodiments, the pressure can be 5 to 100 psig (0.03 to 0.69 MPa).

The method further comprises cooling the homogenous solution to a third temperature to provide particles of the desired size and distribution. In some embodiments, the cooling can be conducted at a desired pressure and using a particular cooling rate effective to provide the desired polymer particles. The third temperature, pressure, and cooling rate depends on the particular polyetherimide and solvent selected, and can be determined without undue experimentation using the guidance provided herein. For example, the third temperature can be less than or equal to 100° C., preferably 25 to 100° C., more preferably 25 to 75° C., even more preferably 40 to 60° C. In some embodiments, cooling the homogenous solution can be at a pressure of 0 to 100 psig (0 to 0.69 MPa). In some embodiments, cooling the homogenous solution is at a constant cooling rate of greater than or equal to 1° C./second, preferably 1 to 3° C./second, more preferably 2 to 2.5° C./second. In some embodiments, cooling the homogenous solution is by a stepwise cooling process. For example, in some embodiments, the solution can be cooled stepwise with one, two, three or more intermediate stops at preselected temperatures which are greater than the third temperature, but less than the second temperature. Cooling to the one or more intermediate temperatures can be at a rate of 0.1 to 1° C./second, or 0.2 to 1° C./second. Furthermore, when a stepwise cooling process is used, the process can include a dwell time of 1 to 10 minutes at each intermediate temperature. In some embodiments, cooling the homogenous solution is preferably at a constant cooling rate of greater than or equal to 1° C./second, preferably 1 to 3° C./second, more preferably 2 to 2.5° C./second.

Cooling the homogeneous solution provides a dispersion comprising a plurality of polymer particles. The resulting polymer particles can have a Dv90 particle size of less than or equal to 250 micrometers, preferably less than or equal to 150 micrometers, more preferably less than or equal to 75 micrometers. In some embodiments, the polymer particles can have a Dv90 particle size of 10 to 250 micrometers, preferably 10 to 150 micrometers, more preferably 10 to 75 micrometers. In some embodiments, the polymer particles can have a Dv90 particle size of 200 to 250 micrometers, preferably 30 to 150 micrometers, more preferably 50 to 100 micrometers. The term "Dv90" as used herein means that 90% of the particles have a diameter that is equal to or less than the recited diameter. "Dv90" particle size is a volume-based particle size diameter.

In some embodiments, the polymer particles are substantially spherical in morphology. For example, the polymer particles can be substantially spherical such that the particles have a sphericity of more than 0.7, preferably more than 0.8, more preferably more than 0.9, even more preferably more than 0.95. For example, the sphericity can be 0.7 to 1.0, or 0.8 to 1.0, or 0.9 to 1.0, or 0.95 to 1.0. The sphericity is defined by $((6 \text{ Vp})/(\text{Dp} \cdot \text{Ap}))$, where Vp is the volume of the particle, Dp is the diameter of the particle, and Ap is the surface area of the particle. The sphericity of the polymer particles can be determined, for example, using scanning electron microscopy (SEM) or optical microscopy imaging techniques.

In some embodiments, the polymer particles are irregularly shaped (i.e., are not spherical, as described above). An irregular, non-spherical particle can have a shape that is, for example, oblong, ellipsoid, elongated, tubular, prolate, cyclindrical, toroidal, distorted, bent, or any other non-spherical shape. In some embodiments, the irregularly shaped particle can have uneven or jagged surfaces.

In some embodiments, the polymer particles can be semi-crystalline. For example, the polymer particles can exhibit both a glass transition temperature (Tg) and a melting temperature (Tm), as measured, for example, using differential scanning calorimetry (DSC).

The polymer particles can subsequently be isolated from the dispersion. Isolating the polymer particles can be by any isolation technique for polymer particles that is generally known, for example, by filtration. In some embodiments, the method further comprises washing the isolated polymer particles with an organic solvent. In some embodiments, the organic solvent is preferably a $C_{1-6}$ alcohol (e.g., methanol, ethanol, propanol, isopropanol, butanol, and the like, or a combination comprising at least one of the foregoing, preferably methanol). In some embodiments, the method can further comprise drying the polymer particles, for example under heat, vacuum, or both. The precise conditions can be determined by one of ordinary skill in the art without undue experimentation. In some embodiments, the particles can be dried at a pressure of less than or equal to 95 kPa, or less than or equal to 70 kPa, or less than or equal to 15 kPa, or less than or equal to 2 kPa, or less than or equal to 0.5 kPa. In some embodiments, the particles can be dried at a temperature of greater than or equal to 100° C., or greater than or equal to 150° C. For example, the polymer particles can be dried at a temperature of greater than or equal to 100° C., and at atmospheric pressure.

Advantageously, no anti-solvent is required in order to precipitate the polymer particles. The polymer particles prepared by the present method can be provided simply by heating and cooling, with no additional solvents required. Examples of anti-solvents that are not required to precipitate the particles and thus their use can be excluded from the present method can include acetone, $C_{1-6}$ alcohols, methyl ethyl ketone, methyl isobutyl ketone, ethyl acetate, water, or a combination comprising at least one of the foregoing.

In a specific embodiment, the method includes combining a polyetherimide comprising repeating units of the formula

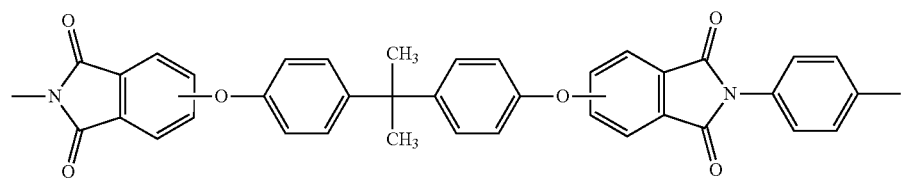

and a solvent comprising ortho-dichlorobenzene at a first temperature of 20 to 50° C. to provide a slurry. The polyetherimide is not soluble in the solvent at the first temperature, and the polyetherimide is present in the mixture at a concentration of 1 to 10 wt %. The method further comprises heating the mixture to a second temperature of 240 to 260° C., for example at a pressure of 20 to 100 psig (137 to 689 kPa) to provide a homogenous solution comprising dissolved polyetherimide and the solvent. The method further comprises cooling the homogenous mixture at a constant rate of 2 to 2.5° C./second to a third temperature of 40 to 60° C., for example at a pressure of 0 to 100 psig (0 to 689 kPa) to provide a dispersion comprising a plurality of polyetherimide particles, and isolating the polyetherimide particles by filtration. The resulting polymer particles have a Dv90 particle size of less than or equal to 75 micrometers.

Another aspect of the present disclosure is a polymer powder prepared according to the above-described method. The polymer powder comprises a plurality of polymer particles comprising a polyetherimide. The polyetherimide can be as described above. The polymer particles have a Dv90 particle size of less than or equal to 250 micrometers, preferably less than or equal to 150 micrometers, more preferably less than or equal to 75 micrometers. In some embodiments, the polymer particles can have a Dv90 particle size of 10 to 250 micrometers, preferably 10 to 150 micrometers, more preferably 10 to 75 micrometers. The particles can be substantially spherical in morphology, or can be irregularly shaped. The morphology of the particles can be determined by the particular conditions of the method used to obtain the powder, as described herein and as further described in the working examples below. The particles can also be semi-crystalline.

Accordingly, the method described herein advantageously provides polymer powders by heating the polymer to a temperature effective to dissolve the polymer, and subsequently cooling the solution to precipitate the desired polymer particles. The morphology and size distribution of the resulting polymer particles can be controlled through the solids content of the solution, the cooling rate used, and the optional addition of a surfactant, as described herein.

This disclosure is further illustrated by the following examples, which are non-limiting.

EXAMPLES

The following examples were carried out using a poly(etherimide) (PEI) made from the reaction of bisphenol A dianhydride and para-phenylene diamine, having a glass transition temperature of 225° C., commercially available as ULTEM 5001 from SABIC.

Polymer Dissolution

PEI and ortho-dichlorobenzene (oDCB) were added to a 10 milliliter (ml) test tube containing a magnetic stir bar. The amount of PEI used was varied, to provide mixtures that were from 5 to 30 wt % solids, where wt % solids is defined as weight of polymer divided by the total weight of solvent (e.g., oDCB) and polymer, multiplied by 100. The test tube was sealed and placed in a Discover SP microwave reactor. The test tube was rated to 100 psig. The PEI was not soluble in the oDCB at room temperature. The test tube containing the PEI/solvent mixture was heated to 250° C., with intermediate stops at 100° C., 200° C., and 225° C. for 20 seconds each. At 250° C., the pressure was noted to be less than 75 pounds per square inch (gauge) (psig). The temperature was maintained at 250° C. for 30 seconds. Dissolution of the polymer during the heating process was monitored with a built-in camera. The PEI was observed to be fully dissolved at about 220° C. at 45 psig.

Polymer Precipitation and Isolation

The homogenous polymer solution at 250° C. was subsequently cooled to 50° C. using three different cooling rates, as shown below in Table 1.

TABLE 1

| Cooling Program | Starting T (° C.) | Ending T (° C.) | Cooling Rate (° C./second) | Dwell time at ending T (minutes) |
|---|---|---|---|---|
| A | 250 | 50 | 2.27 | 0 |
| B | 250 | 50 | 1.00 | 0 |
| C | 250 | 215 | 0.23 | 2 |
|   | 215 | 210 | 0.23 | 5 |
|   | 210 | 205 | 0.23 | 10 |
|   | 205 | 195 | 0.23 | 10 |
|   | 195 | 100 | 0.23 | 0 |
|   | 100 | 50 | 1.00 | 0 |

Programs A and B shown in Table 1 utilized constant cooling rates of 2.27° C./second and 1.00° C./second, respectively, to cool the homogenous polymer solution from 250° C. to 50° C. In contrast, program C used staged cooling. When the polymer solution reached 50° C., the test tube was removed from the microwave reactor, any pressure was relieved in a safe manner, and the contents of the test tube were filtered using a Buchner funnel with filter paper having 6 micrometer pore size. The resulting powder was washed with 50 milliliters of methanol to remove residual solvent. The powder was subsequently dried in a vacuum over at 180° C. overnight.

Particle Size Characterization Using Laser Diffraction

An aqueous slurry was prepared by adding the isolated PEI powder (0.1 grams) to deionized water (10 ml) containing 1 wt % sodium dodecylbenzene sulfonate (SDBS). The resulting aqueous slurry was sonicated for 5 to 10 minutes to de-agglomerate the polymer particles. The particle size distribution was determined using Malvern 3000 equipment. Volume-based diameters (Dv) for Dv90, Dv50, and Dv10 were recorded. The term "Dv90" means that 90% of the particles have a diameter that is equal to or less than the recited diameter.

Particle Morphology Using Microscopy

The morphology of the polymer powders were evaluated using microscopy with 1000× magnification coupled with a digital camera. The polymer powder precipitated from oDCB as described above was spread on a glass slide to form a thin layer of particles.

Effect of Percent Solids on Particle Morphology and Size Distribution

Figure 2:
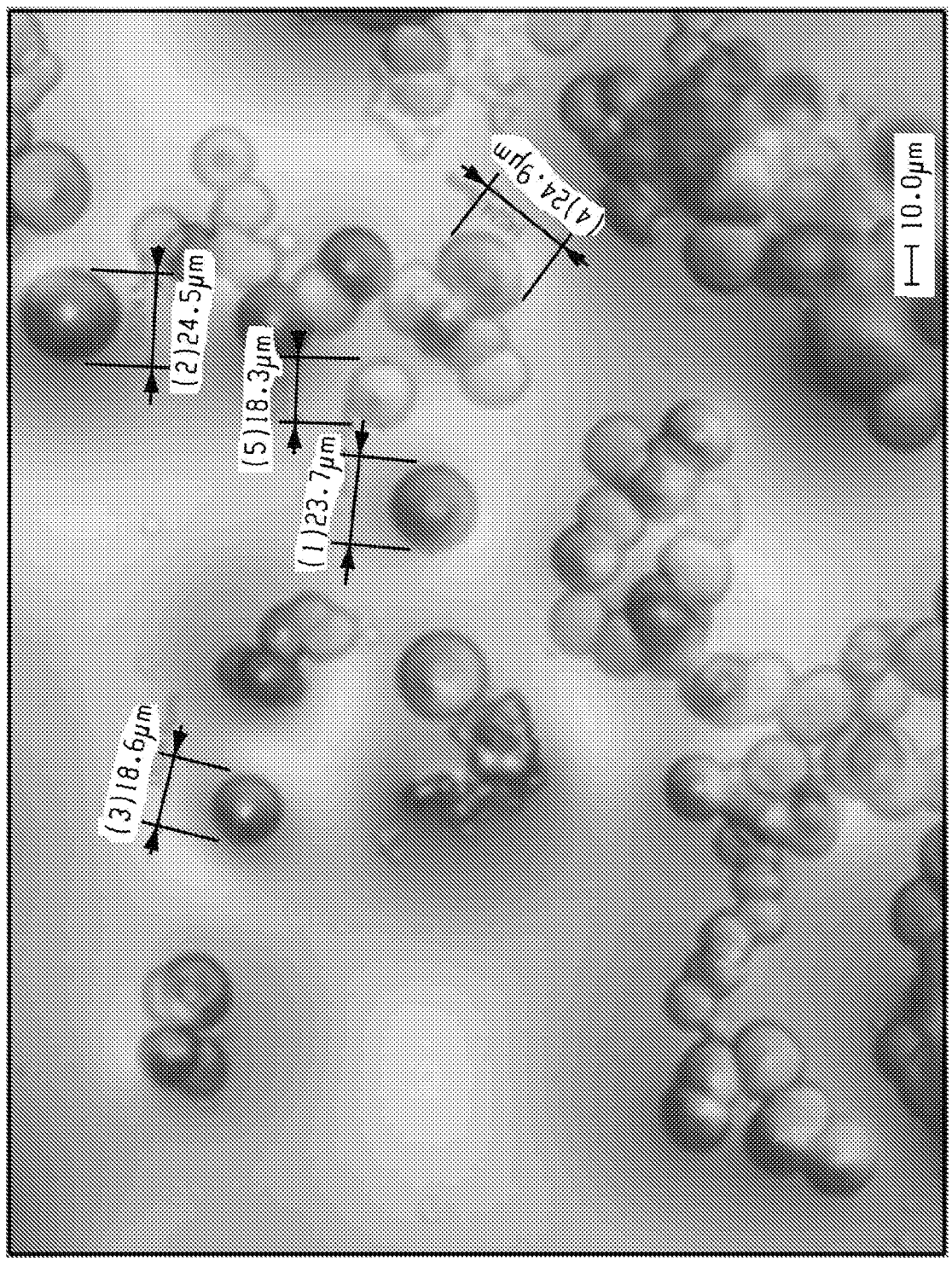
FIG. 2 shows an optical micrograph of polymer particles of Example 2.
Figure 3:
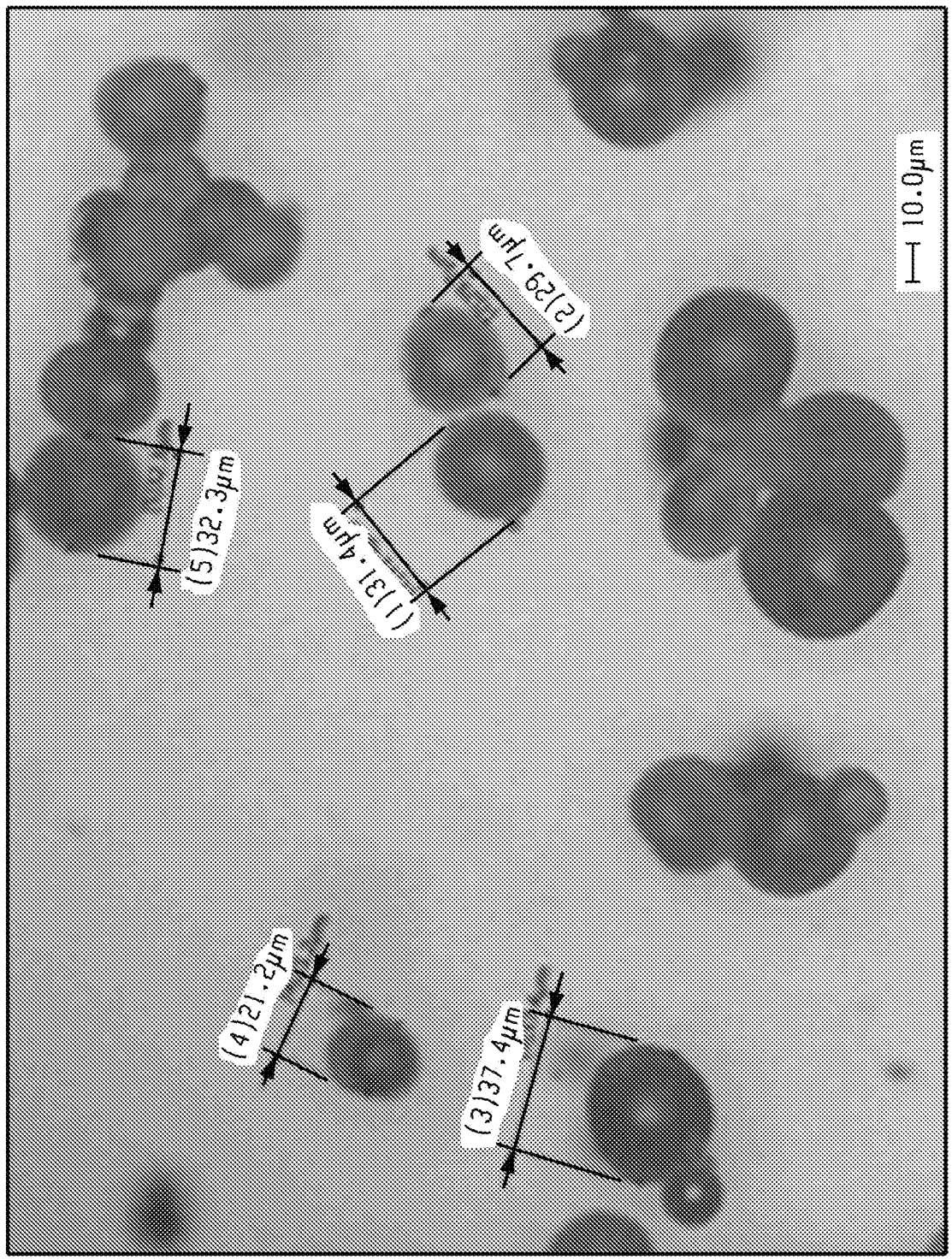
FIG. 3 shows an optical micrograph of polymer particles of Example 3.
Figure 4:
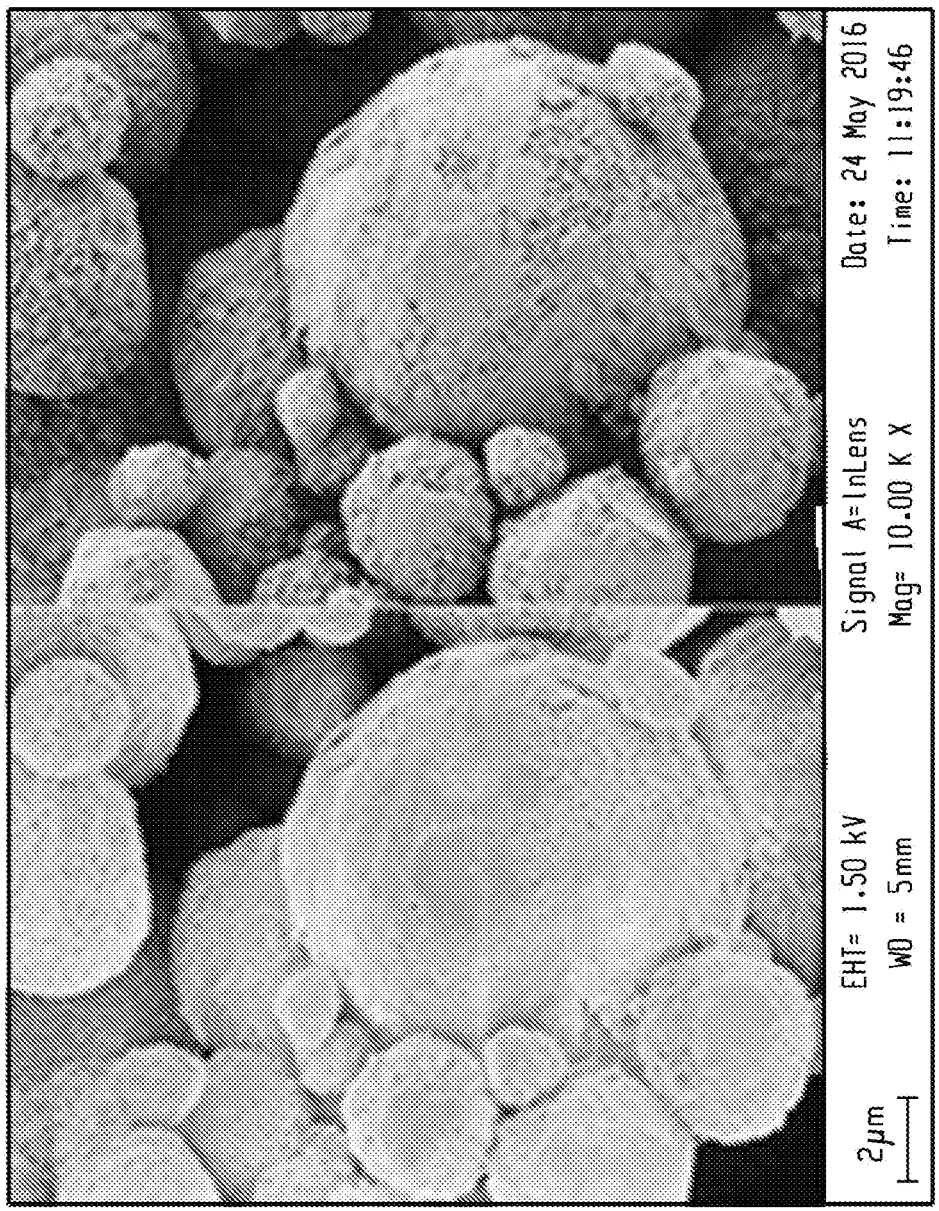
FIG. 4 shows a scanning electron micrograph (SEM) of the Example 1 polymer particles.

In order to understand the effect of polymer concentration (i.e., percent solids, whether dissolved or solid), experiments were conducted using the constant cooling rate of 2.27° C./sec (Program A) with solutions having percent solids ranging from 5 to 30 wt %. The particle size distribution and the particle morphology was characterized as described above, and the results are presented below in Table 2. When the percent solids increased to 30 wt %, the polymer precipitates as a congealed mass, rather than the desired polymer particles (Example 4, Table 2). It can further be noted from Table 2 that when the polymer concentration was increased from 5 to 20 wt %, the Dv90 also increases, indicating that larger particles can be formed by increasing the polymer concentration. The particle morphology was evaluated using microscopy, as described above. FIGS. 1 to 3, corresponding to Examples 1-3, show the spherical nature of the particles resulting from the varying polymer concentration solutions observed using optical microscopy. FIG. 4 shows the spherical nature of the particles of Example 1 observed using scanning electron microscopy (SEM). The SEM image of FIG. 4 used 10,000× magnification, and the samples were coated with Pt/Pd and imaged using SEM in Inlens and secondary electron (SE) mode, using a Zeiss Supra 40 VP instrument.

TABLE 2

| Example | % Solids | Solvent | Cooling Rate Program | Dv90 (µm) | Dv50 (µm) | Dv10 (µm) | Observed Morphology |
|---|---|---|---|---|---|---|---|
| 1 | 5 | o-DCB | A | 64.8 | 26.5 | 7.84 | Spherical |
| 2 | 10 | o-DCB | A | 143 | 54.1 | 20.5 | Spherical |
| 3 | 20 | o-DCB | A | 238 | 102 | 10.4 | Spherical |
| 4 | 30 | o-DCB | A | — | — | — | — |

Effect of Cooling Rate on Particle Morphology and Size Distribution

Figure 5:
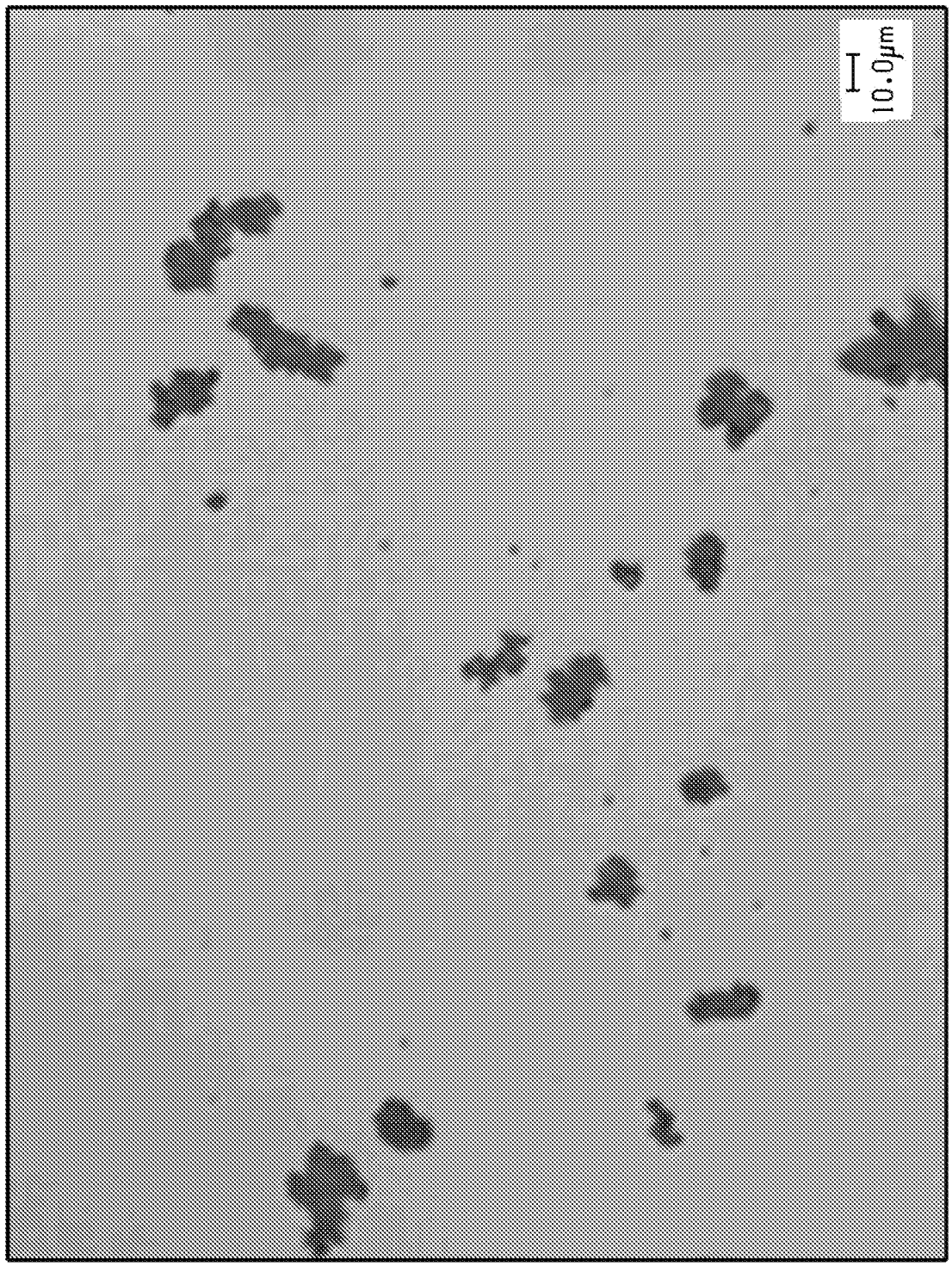
FIG. 5 shows an optical micrograph of polymer particles of Example 5.
Figure 6:
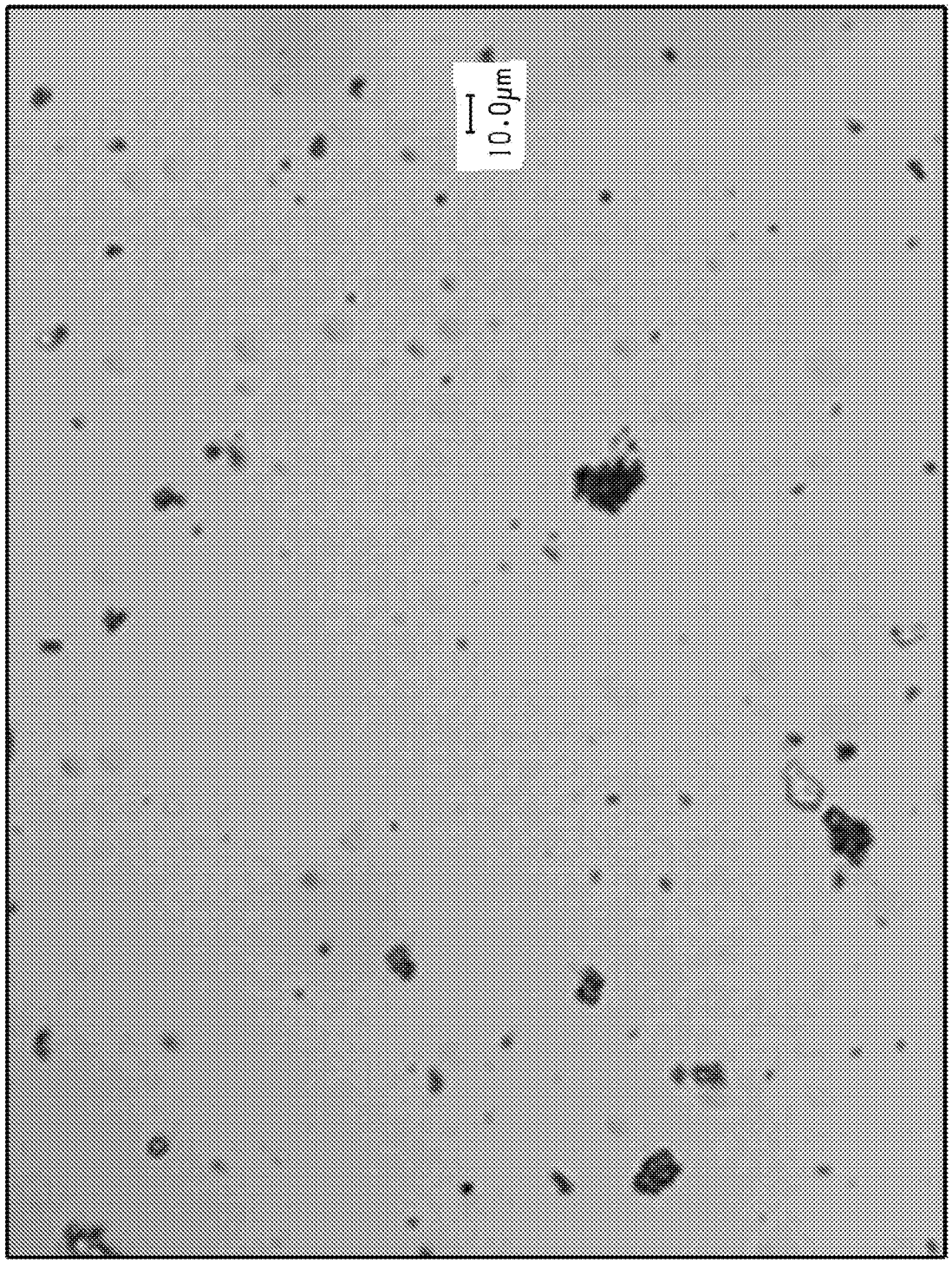
FIG. 6 shows an optical micrograph of polymer particles of Example 6.

To understand the effect of cooling rate of the resulting particle morphology and size distribution, experiments were conducted using solutions having a polymer concentration of 5 wt % with the varying cooling rate programs that were described above. The particle size distribution and the morphology from each of the examples are given below in Table 3. From Table 3, it can be noted that a Dv90 of less than 75 micrometers can be achieved irrespective of the cooling rate used during the precipitation stage. The powders resulting from a cooling rate of 2.27° C./second showed a spherical morphology, as shown in FIG. 1. Powders resulting from slower cooling rates (e.g., Program B or C) generally showed non-spherical (i.e., irregular) morphology, as shown in FIGS. 5 and 6, respectively.

TABLE 3

| Example | % Solids | Solvent | Cooling Rate Program | Dv90 (μm) | Dv50 (μm) | Dv10 (μm) | Morphology |
|---|---|---|---|---|---|---|---|
| 1 | 5 | o-DCB | A | 64.8 | 26.5 | 7.84 | Spherical |
| 5 | 5 | o-DCB | B | 62.1 | 30.2 | 5.92 | Non-spherical |
| 6 | 5 | o-DCB | C | 59.5 | 24 | 5.44 | Non-Spherical |

Figure 7:
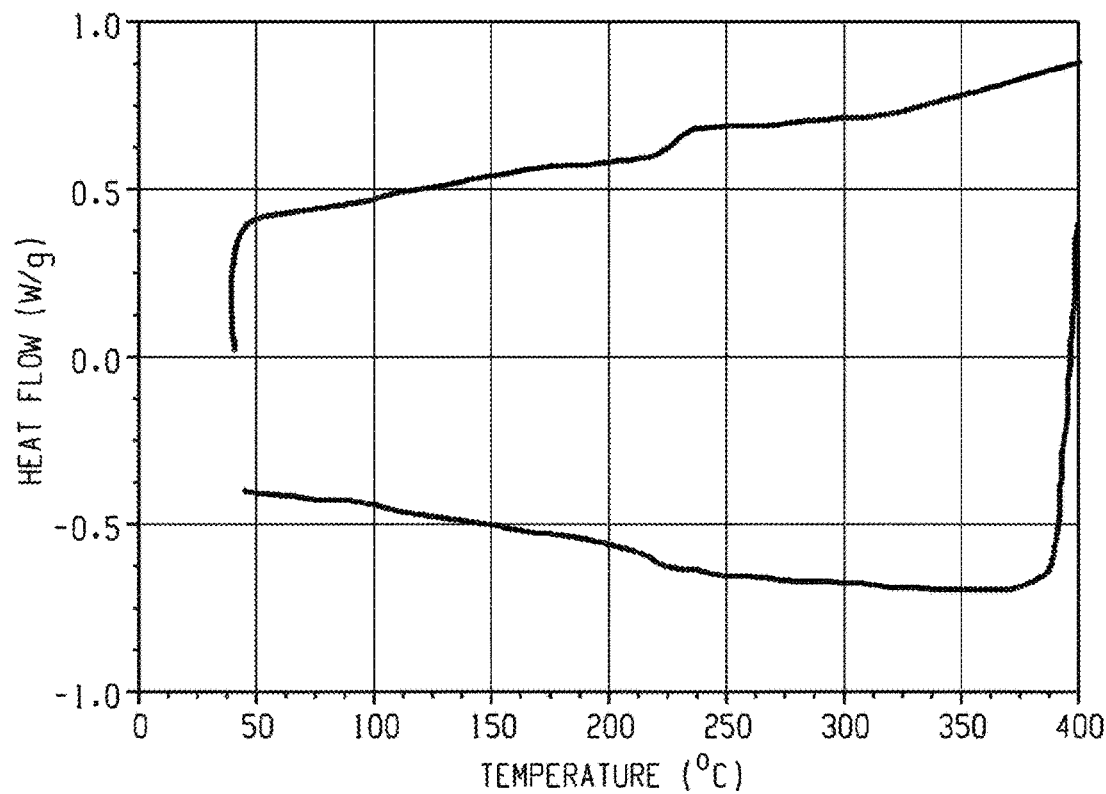
FIG. 7 shows a thermogram of a first heating cycle of commercial PEI pellets obtained by differential scanning calorimetry (DSC).
Figure 8:
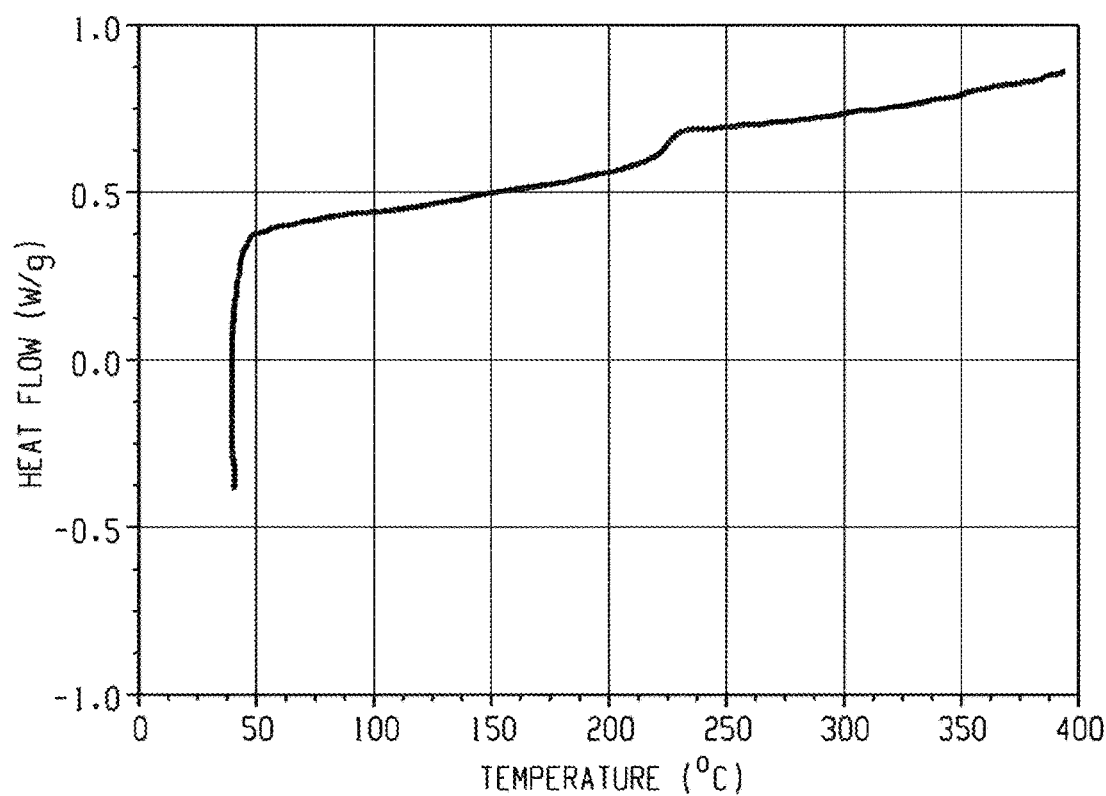
FIG. 8 shows a thermogram of a second heating cycle of commercial PEI pellets obtained by DSC.
Figure 9:
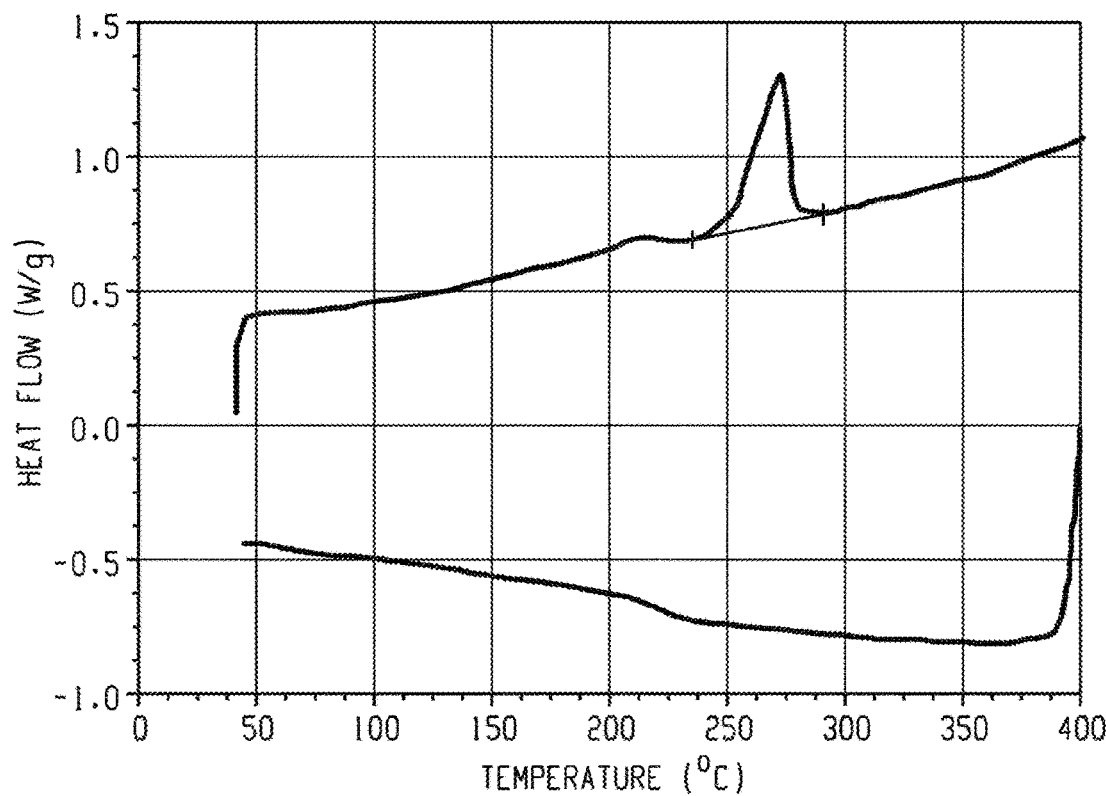
FIG. 9 shows a thermogram of a first heating cycle of polymer particles of Example 1 obtained by DSC.
Figure 10:
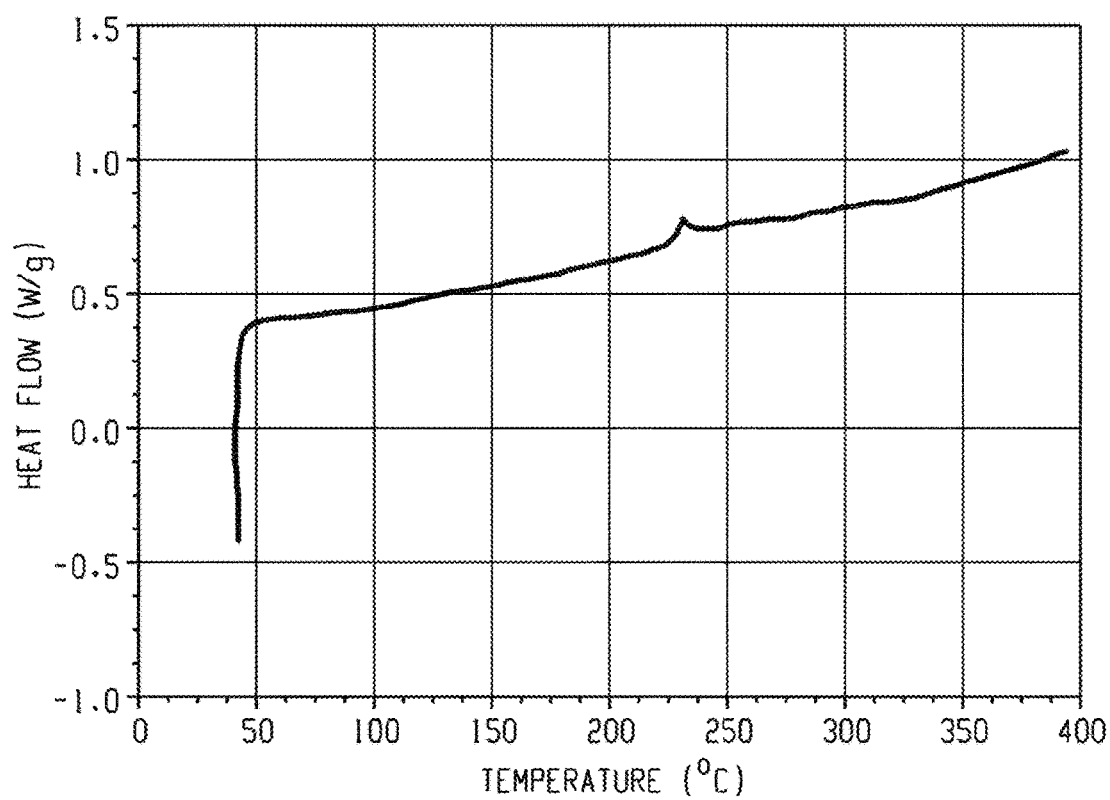
FIG. 10 shows a thermogram of a first heating cycle of polymer particles of Example 1 obtained by DSC.

The thermal properties of the Example 1 powder were also characterized, and compared to those of the corresponding poly(etherimide) in pellet form, obtained commercially as ULTEM 5001 from SABIC. The thermal properties were evaluated using differential scanning calorimetry (DSC) with a 20° C. per minute ramp rate. The commercial pellets were observed to exhibit a glass transition temperature (Tg) of 225° C. during both the first and second heating cycles. The first heating cycle of commercial pellets is shown in FIG. 7, and the second heating cycle of commercial pellets is shown in FIG. 8. In contrast, the powder of Example 1 exhibited a melting temperature (Tm) of 271° C. and a Tg of 225° C. during the first heating cycle, as shown in FIG. 9. The second heating cycle of the Example 1 powder, shown in FIG. 10, exhibited only a Tg at 226° C. This result for the Example 1 powder demonstrates the semi-crystalline nature of the powders prepared as described herein.

Accordingly, as demonstrated by the examples above, the particle size distribution and morphology can be controlled through careful selection of cooling conditions and polymer solution concentration.

This disclosure further encompasses the following embodiments, which are non-limiting.

Embodiment 1

A method of preparing polymer particles, the method comprising combining a polyetherimide and a solvent at a first temperature to provide a slurry, wherein the polyetherimide is not soluble in the solvent at the first temperature; heating the slurry to a second temperature and at a pressure effective to dissolve the polyetherimide in the solvent to provide a homogenous solution; cooling the homogenous solution to a third temperature to provide a dispersion comprising a plurality of polymer particles; and isolating the polymer particles from the dispersion; wherein the polymer particles have a Dv90 particle size of less than or equal to 250 micrometers, preferably less than or equal to 150 micrometers, more preferably less than or equal to 75 micrometers, and wherein the polyetherimide comprises repeating units of the formula

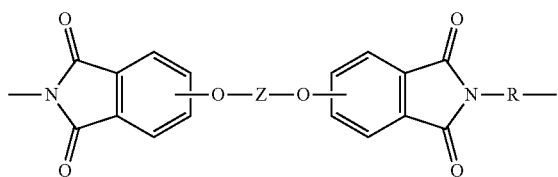

wherein at least 90 mole percent, or at least 95 mole percent, or at least 98 mole percent of the R groups are para-phenylene and the remaining R groups are each independently the same or different, and are a substituted or unsubstituted $C_{6-20}$ aromatic hydrocarbon group, a substituted or unsubstituted, straight or branched chain $C_{4-20}$ alkylene group, a substituted or unsubstituted $C_{3-8}$ cycloalkylene group, or a combination comprising at least one of the foregoing; and each Z is independently an aromatic $C_{6-24}$ monocyclic or polycyclic group optionally substituted with 1 to 6 $C_{1-8}$ alkyl groups, 1 to 8 halogen atoms, or a combination comprising at least one of the foregoing.

Embodiment 2

The method of embodiment 1, wherein the polymer particles are substantially spherical in morphology.

Embodiment 3

The method of embodiment 1, wherein the polymer particles are irregularly shaped.

Embodiment 4

The method of any one or more of embodiments 1 to 3, wherein the first temperature is less than or equal to 100° C., preferably 15 to 100° C., more preferably 20 to 50° C.

Embodiment 5

The method of any one or more of embodiments 1 to 4, wherein the second temperature is greater than or equal to 200° C., preferably 200 to 300° C., more preferably 225 to 275° C., even more preferably 240 to 260° C., at a pressure of 0.03 to 0.69 MPa.

Embodiment 6

The method of any one or more of embodiment 1 to 5, wherein the third temperature is less than or equal to 100° C., preferably 25 to 100° C., more preferably 25 to 75° C., even more preferably 40 to 60° C., and at a pressure of 0 to 0.69 MPa.

Embodiment 7

The method of any one or more of embodiments 1 to 6, wherein at least 90 mole percent, or at least 95 mole percent, or at least 98 mole percent of the R groups are para-phenylene and the remaining R groups are meta-phenylene; preferably wherein 100 mole percent of the R groups are p-phenylene.

Embodiment 8

The method of any one or more of embodiments 1 to 7, wherein R is a divalent group of the formula

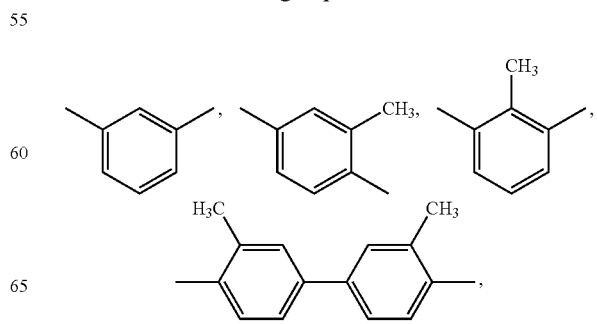

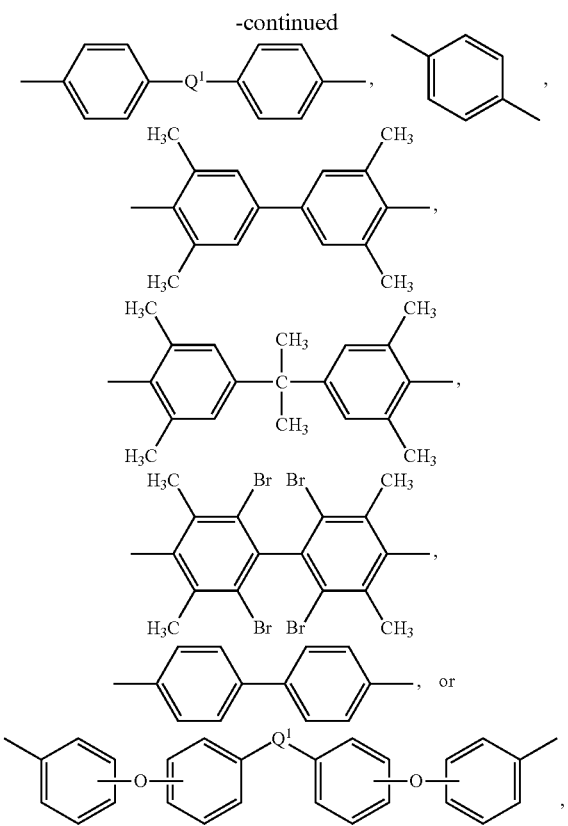

wherein $Q^1$ is —O—, —S—, —C(O)—, —$SO_2$—, —SO—, —P($R^a$)(=O)— wherein $R^a$ is a $C_{1-8}$ alkyl or $C_{6-12}$ aryl, —$C_yH_{2y}$— or a halogenated derivative thereof; y is an integer from 1 to 5, or —$(C_6H_{10})_z$—; z is an integer from 1 to 4; and Z is a group derived from a dihydroxy compound of the formula

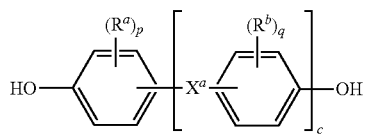

wherein $R^a$ and $R^b$ are each independently a halogen atom or a monovalent $C_{1-6}$ alkyl group; p and q are each independently integers of 0 to 4; c is 0 to 4; and $X^a$ is a single bond, —O—, —S—, —S(O)—, —$SO_2$—, —C(O)—, or a $C_{1-18}$ organic bridging group.

Embodiment 9

The method of any one or more of embodiments 1 to 8, wherein each Z is 4,4'-diphenylene isopropylidene.

Embodiment 10

The method of any one or more of embodiments 1 to 9, wherein the solvent is an organic solvent comprising ortho-dichlorobenzene, ortho-cresol, meta-cresol, para-cresol, chlorobenzene, bromobenzene, anisole, veratrole, dichlorotoluene, dichlorobenzene, 1,2,4-trichlorobenzene, xylene, toluene, benzene, ethylbenzene, propylbenzene, mesitylene, N-methylpyrrolidinone, dimethylacetamide, dimethylformamide, diphenyl sulfone, diphenylether, phenetole, dimethylsulfoxide, sulfolane, dimethylsulfolane, methylene chloride, ethylene tetrachloride, trichloromethane, acetone, methanol, ethanol, cyclopentanone, tetrahydrofuran, or a combination comprising at least one of the foregoing, preferably wherein the solvent comprises ortho-dichlorobenzene.

Embodiment 11

The method of any one or more of embodiments 1 to 10, wherein cooling the homogenous solution is at a constant cooling rate of greater than or equal to 1° C./second, preferably 1 to 3° C./second, more preferably 2 to 2.5° C./second.

Embodiment 12

The method of any one or more of embodiments 1 to 11, wherein cooling the homogenous solution is by a stepwise cooling process.

Embodiment 13

The method of any one or more of embodiments 1 to 12, wherein the slurry has a solids content of less than 40%, or less than 30%, or 1 to 20%, or 1 to 10%, or 1 to 5%.

Embodiment 14

The method of any one or more of embodiments 1 to 13, wherein isolating the polymer powder is by filtration.

Embodiment 15

The method of any one or more of embodiments 1 to 14, wherein the slurry further comprises a surfactant, preferably an anionic surfactant, more preferably ammonium lauryl sulfate, sodium lauryl ether sulfate, sodium myreth sulfate, dioctyl sodium sulfosuccinate, perfluorooctanesulfonate, perfluorobutanesulfonate, sodium dodecyl benzene sulfonate, sodium lauryl sulfate, or a combination comprising at least one of the foregoing; or a nonionic surfactant, more preferably a nonionic surfactant is a $C_{6-12}$ alkyl phenol having 4 to 25 moles of ethylene oxide per mole of $C_{6-12}$ alkylphenol, a $C_{8-22}$ aliphatic alcohol ethoxylate having about 1 to about 25 moles of ethylene oxide, or a combination comprising at least one of the foregoing; or a combination comprising at least one of the foregoing surfactants.

Embodiment 16

The method of embodiment 15, wherein the surfactant is present in an amount of 0.1 to 10 weight percent based on the total weight of the slurry.

Embodiment 17

The method of any one or more of embodiments 1 to 16, where no anti-solvent is used to precipitate the polymer to provide the polymer particles, preferably wherein the anti-solvent comprises acetone, $C_{1-6}$ alcohols, methyl ethyl ketone, methyl isobutyl ketone, ethyl acetate, water, or a combination comprising at least one of the foregoing.

Embodiment 18

The method of any one or more of embodiments 1 to 17, further comprising washing the isolated polymer particles with an organic solvent, preferably a $C_{1-6}$ alcohol.

Embodiment 19

The method of any one or more of embodiments 1 to 18, further comprising drying the polymer particles under heat and vacuum.

Embodiment 20

The method of embodiment 1, comprising combining a polyetherimide comprising repeating units of the formula

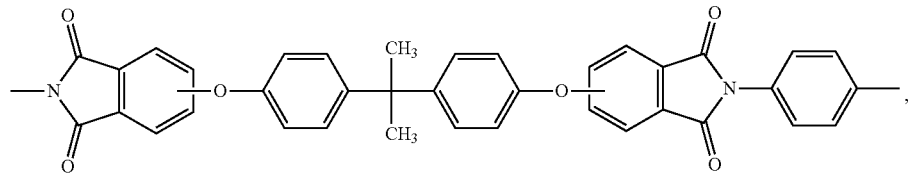

and a solvent comprising ortho-dichlorobenzene at a first temperature of 20 to 50° C. to provide a slurry, wherein the polyetherimide is not soluble in the solvent at the first temperature, and the polyetherimide is present in the slurry at a concentration of 1 to 10 wt %; heating the slurry to a second temperature of 240 to 260° C. and a pressure of 137 to 689 kPa to provide a homogenous solution comprising dissolved polyetherimide and the solvent; cooling the homogenous solution at a constant rate of 2 to 2.5° C./second to a third temperature of 40 to 60° C. and a pressure of 0 to 689 kPa to provide a dispersion comprising a plurality of polyetherimide particles; and isolating the polyetherimide particles by filtration; wherein the polymer particles have a Dv90 particle size of less than or equal to 75 micrometers.

Embodiment 21

A polymer powder prepared by the method of any one or more of embodiments 1 to 20, wherein the polymer powder comprises a plurality of polymer particles having a Dv90 particle size of less than or equal to 250 micrometers, preferably less than or equal to 150 micrometers, more preferably less than or equal to 75 micrometers; the polymer particles are substantially spherical in morphology; and the polymer particles are semi-crystalline.

Embodiment 22

A polymer powder prepared by the method of any one or more of embodiments 1 to 20, wherein the polymer powder comprises a plurality of polymer particles having a Dv90 particle size of less than or equal to 250 micrometers, preferably less than or equal to 150 micrometers, more preferably less than or equal to 75 micrometers; the polymer particles are irregularly shaped in morphology; and the polymer particles are semi-crystalline.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—$NO_2$), a cyano (—CN), a $C_{1-6}$ alkyl sulfonyl (—S(=O)$_2$-alkyl), a $C_{6-12}$ aryl sulfonyl (—S(=O)$_2$-aryl)a thiol (—SH), a thiocyano (—SCN), a tosyl ($CH_3C_6H_4SO_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —$CH_2CH_2CN$ is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of preparing polymer particles, the method comprising
    combining a polyetherimide and a solvent at a first temperature to provide a slurry, wherein the polyetherimide is not soluble in the solvent at the first temperature;
    heating the slurry to a second temperature and at a pressure effective to dissolve the polyetherimide in the solvent to provide a homogenous solution;
    cooling the homogenous solution to a third temperature to provide a dispersion comprising a plurality of polymer particles; and
    isolating the polymer particles from the dispersion;
    wherein the polymer particles have a Dv90 particle size of less than or equal to 250 micrometers, and
    wherein the polyetherimide comprises repeating units of the formula

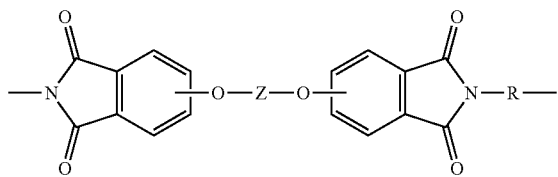

wherein
    at least 90 mole percent of the R groups are para-phenylene and the remaining R groups are each independently the same or different, and are a substituted or unsubstituted $C_{6-20}$ aromatic hydrocarbon group, a substituted or unsubstituted, straight or branched chain $C_{4-20}$ alkylene group, a substituted or unsubstituted $C_{3-8}$ cycloalkylene group, or a combination comprising at least one of the foregoing; and
    each Z is independently an aromatic $C_{6-24}$ monocyclic or polycyclic group optionally substituted with 1 to 6 $C_{1-8}$ alkyl groups, 1 to 8 halogen atoms, or a combination comprising at least one of the foregoing.

2. The method of claim 1, wherein the polymer particles are substantially spherical in morphology.

3. The method of claim 1, wherein the first temperature is less than or equal to 100° C.

4. The method of claim 1, wherein the second temperature is greater than or equal to 200° C., at a pressure of 0.03 to 0.69 MPa.

5. The method of claim 1, wherein the third temperature is less than or equal to 100° C., and at a pressure of 0 to 0.69 MPa.

6. The method of claim 1, wherein at least 90 mole percent of the R groups are para-phenylene and the remaining R groups are meta-phenylene.

7. The method of claim 1, wherein
    R is a divalent group of the formula

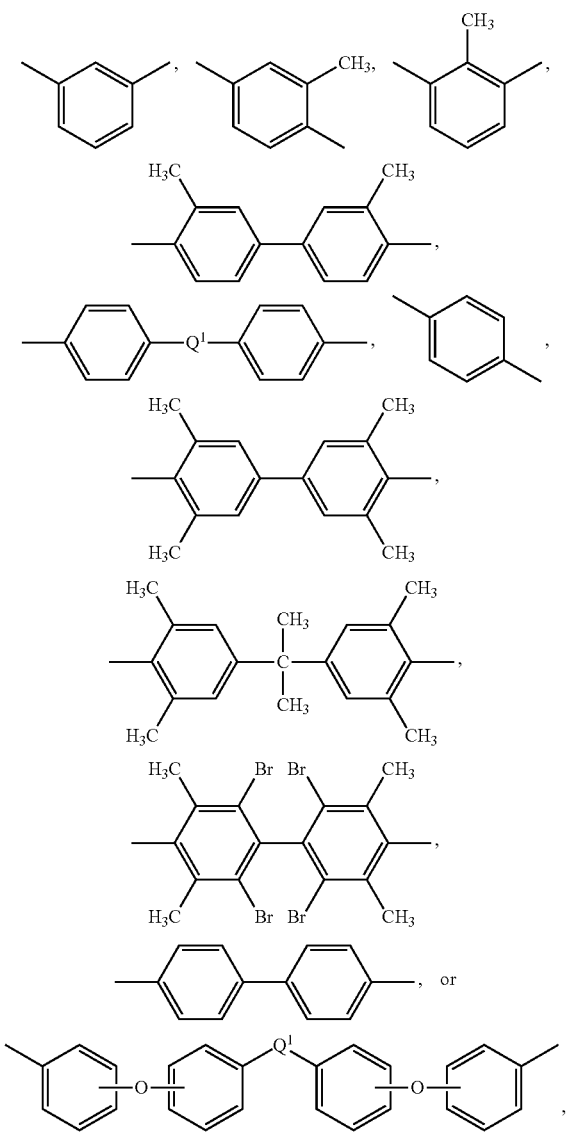

wherein

Q¹ is —O—, —S—, —C(O)—, —SO₂—, —SO—, —P(Rᵃ)(=O)— wherein Rᵃ is a $C_{1-8}$ alkyl or $C_{6-12}$ aryl, —$C_yH_{2y}$— or a halogenated derivative thereof;

y is an integer from 1 to 5, or —$(C_6H_{10})_z$—;

z is an integer from 1 to 4; and

Z is a group derived from a dihydroxy compound of the formula

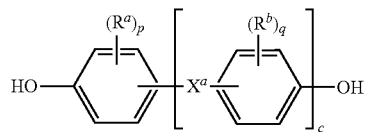

wherein
R^a and R^b are each independently a halogen atom or a monovalent $C_{1-6}$ alkyl group;
p and q are each independently integers of 0 to 4;
c is 0 to 4; and
$X^a$ is a single bond, —O—, —S—, —S(O)—, —SO₂—, —C(O)—, or a $C_{1-18}$ organic bridging group.

8. The method of claim 1, wherein each Z is 4,4'-diphenylene isopropylidene.

9. The method of claim 1, wherein the solvent is an organic solvent comprising ortho-dichlorobenzene, ortho-cresol, meta-cresol, para-cresol, chlorobenzene, bromobenzene, anisole, veratrole, dichlorotoluene, di chlorobenzene, 1,2,4-trichlorobenzene, xylene, toluene, benzene, ethylbenzene, propylbenzene, mesitylene, N-methylpyrrolidinone, dimethylacetamide, dimethylformamide, diphenyl sulfone, diphenylether, phenetole, dimethyl sulfoxide, sulfolane, dimethyl sulfolane, methylene chloride, ethylene tetrachloride, trichloromethane, acetone, methanol, ethanol, cyclopentanone, tetrahydrofuran, or a combination comprising at least one of the foregoing.

10. The method of claim 1, wherein cooling the homogenous solution is at a constant cooling rate of greater than or equal to 1° C./second.

11. The method of claim 1, wherein cooling the homogenous solution is by a stepwise cooling process.

12. The method of claim 1, wherein the slurry has a solids content of less than 40%.

13. The method of claim 1, wherein isolating the polymer powder is by filtration.

14. The method of claim 1, wherein the slurry further comprises a surfactant.

15. The method of claim 14, wherein the surfactant is present in an amount of 0.1 to 10 weight percent based on the total weight of the slurry.

16. The method of claim 1, where no anti-solvent is used to precipitate the polymer to provide the polymer particles.

17. The method of claim 1, further comprising washing the isolated polymer particles with an organic solvent.

18. The method of claim 1, comprising
combining
a polyetherimide comprising repeating units of the formula

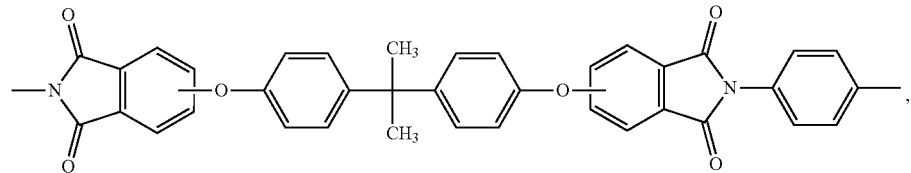

and
a solvent comprising ortho-dichlorobenzene
at a first temperature of 20 to 50° C. to provide a slurry, wherein the polyetherimide is not soluble in the solvent at the first temperature, and the polyetherimide is present in the slurry at a concentration of 1 to 10 wt %;
heating the slurry to a second temperature of 240 to 260° C. and a pressure of 137 to 689 kPa to provide a homogenous solution comprising dissolved polyetherimide and the solvent;
cooling the homogenous solution at a constant rate of 2 to 2.5° C./second to a third temperature of 40 to 60° C. and a pressure of 0 to 689 kPa to provide a dispersion comprising a plurality of polyetherimide particles; and
isolating the polyetherimide particles by filtration;
wherein the polymer particles have a Dv90 particle size of less than or equal to 75 micrometers.

19. A polymer powder prepared by the method of claim 1, wherein
the polymer powder comprises a plurality of polymer particles having a Dv90 particle size of less than or equal to 250 micrometers;
the polymer particles are substantially spherical in morphology; and
the polymer particles are semi-crystalline.

20. A polymer powder prepared by the method of claim 1, wherein
the polymer powder comprises a plurality of polymer particles having a Dv90 particle size of less than or equal to 250 micrometers;
the polymer particles are irregularly shaped in morphology; and
the polymer particles are semi-crystalline.

* * * * *